ELECTRICAL INFORMATION SYSTEM

Filed Dec. 7, 1956 2 Sheets-Sheet 1

INVENTOR
A. FEINER
BY [signature]
ATTORNEY

June 23, 1959 A. FEINER 2,892,037

ELECTRICAL INFORMATION SYSTEM

Filed Dec. 7, 1956 2 Sheets-Sheet 2

INVENTOR
A. FEINER
BY James S. Falk
ATTORNEY

United States Patent Office 2,892,037
Patented June 23, 1959

2,892,037

ELECTRICAL INFORMATION SYSTEM

Alexander Feiner, New York, N.Y., assignor to Bell Telephone Laboratories, Incorporated, New York, N.Y., a corporation of New York Application December 7, 1956, Serial No. 626,846

12 Claims. (Cl. 179—18)

This invention relates to systems for determining the condition of a plurality of lines or terminals in locations remote from a control station and, more particularly, to such a system for determining in a telephone system the condition of a plurality of subscriber lines.

In many applications it is desirable to determine the electrical condition of a line or group of lines by means other than through the lines themselves. Thus, in the application Serial No. 555,916 filed December 28, 1955 of M. L. Almquist, A. E. Joel and M. Posin, for example, there is described a telephone system in which a large number of subscriber lines are connected to a central office through a satellite office by means of a smaller number of trunk connections whereby considerable savings in the telephone plant, and particularly in the copper required from the subscriber loops, are effected. As the subscriber lines themselves do not enter the central office, it is necessary to employ means to detect and formulate information concerning the condition at any time of any of the satellite lines other than through the lines themselves.

The information normally required concerning a telephone subscriber line is whether the line is idle, requesting new service, or busy. A line is idle when the telephone instrument which it connects to the exchange office is not in use or is "on hook" thus presenting an incomplete subscriber loop circuit. A line is requesting new service or busy when the telephone receiver has been removed from its cradle or is "off hook" thus completing the subscriber loop circuit. Upon receipt of this advice and with knowledge of the particular line to which the advice pertains, switching equipment is activated to complete or break connections between subscriber lines or between lines and trunks as required.

The character of the signals provided by such line detecting apparatus in a telephone system is such as to indicate the presence or absence of current flow in the subscriber line loop. Normally current flow in the line loop is present when the telephone receiver is "off hook," completing the line loop, and is absent when the telephone receiver is "on hook," presenting an open line loop. Thus, detection of the presence of current flow implies an "off hook" condition and absence of current flow implies an "on hook" condition. However, current flow in the line loop may result from various causes other than closure of the line loop such as longitudinal currents induced in the line conductors from nearby power circuits. The line detecting apparatus may mistake such current flow for the closed line loop current and transmit a spurious signal to the switching equipment. Most such causes may be overcome by use of improved cable plant and proper maintenance procedures, but induced currents may continue to present difficulty.

While this invention will be described with reference to telephone systems, and more particularly with reference to a telephone system of the type described in the above-mentioned application, it is to be understood that it is not limited to telephone applications alone, as my novel circuit is equally applicable to other systems where information is to be supplied indicative of the condition of electrical lines.

It is a general object of this invention to enable ascertainment of the condition of any of a number of lines other than through the lines themselves.

More specifically it is one object of this invention to provide an improved means for scanning a number of lines and transmitting information only as to two distinct line conditions as determined by scanning thereof.

Further, it is an object of this invention to improve line scanning so as to detect current flow from one source and no other.

In one specific illustrative embodiment of this invention, the line information scanner comprises a plurality of transmission gates. Each of these gates is associated with a distinct telephone subscriber line, and the gates are connected in an orderly array in accordance with the code assigned to the telephone instruments.

Interrogating pulses are applied to the gate array such that periodically each gate receives a signal pulse. Each gate is connected to the associated subscriber line in such a manner that current flow upon closure of the line loop develops a bias voltage at the gate sufficient to prevent passage of the interrogating pulse through the gate. Absence of this voltage, the normal condition when the line loop is open or idle, permits the interrogating pulse to pass through the gate. The presence or absence of amplified pulses from the gate during the particular interval or time slot assigned to the line associated with that gate advises switching control equipment of the line condition so that proper switching action may be taken.

Connection of the transmission gate to the line as shown in the above-mentioned application is by a single lead from one side of the line loop to one side of the gate thus providing a bias voltage at the connecting point when current is flowing in the line loop. It is possible with this configuration for spurious currents developed in the line loop, such as those induced from adjacent power lines, to produce the bias voltage when the line loop is open thereby causing operation of the gate as if the line loop was closed.

The gating circuit in accordance with this invention overcomes the spurious indications developed by such induced currents by utilizing a balanced arrangement in which leads from opposite sides of the line loop are connected to opposite ends of the gating circuit. Circuit elements may be chosen to provide voltage levels at the connecting points which permit gating of interrogating pulses when the line loop is open and a voltage differential between the connecting points sufficient to back bias the gate so as to block interrogating pulses when the line loop is closed. Induced longitudinal currents in each side of the line loop will vary the voltage at each connecting point in equal amounts, so that a voltage differential cannot be developed across the gate from such currents sufficient to block the interrogating pulses.

In accordance with one aspect of the invention a voltage is applied to one connecting link between gate and line loop to balance the negative battery present on the line loop. This voltage thus is connected through the connecting link to the grounded or tip side of the line loop. The connecting link between the gate and the battery or ring side of the line is grounded. Thus the points of connection to the gate may be placed at identical voltage levels.

In accordance with another aspect of this invention, the additional voltage source is omitted, and a capacitance is inserted in the connecting link to the ring lead of the line loop. This takes cognizance of the fact that the transient currents are alternating and thus may pass to both connecting points, while a path for line loop battery through the gate is blocked by the capacitance in the connecting link. Thus the connecting points are at ground potential with the line loop open, are raised in equal amounts by the transient conditions described hereinbefore, and are at unequal potentials sufficient to establish a blocking bias across the gate when normal line loop current is present.

It is a feature of this invention that a line to be interrogated has associated therewith a gating circuit and that connections be made from the line to each end of the gating circuit, means being provided for generating a signal pulse at one end of the gating circuit and reproducing the signal pulse at the opposite end thereof whenever the line is open. Further, in accordance with this feature of the invention, means is provided to back bias the gating circuit only when the line is closed.

It is a further feature of this invention that the gating circuit comprise a unidirectional current flow device with pulse forming capacitances connected on the sides of the line connections remote from the device.

It is a feature accordance to one aspect of this invention that a voltage source be connected to the tip lead of a line loop through the connection to the gating circuit and that the lead connecting the gating circuit to the ring lead of the line loop be grounded.

It is a feature according to another aspect of this invention that capacitance means be included in the lead connecting the gating circuit and the ring lead of the line loop.

These and other features of this invention may be readily understood from consideration of the following detailed description and the accompanying drawing, in which.

Figure 1:
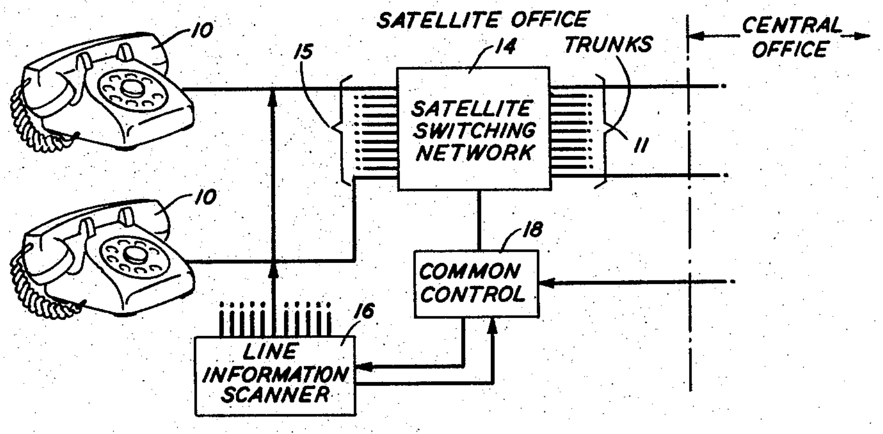
Fig. 1 is a block diagram representation of a telephone system in which this invention may be advantageously utilized.

Referring now to the drawing, Fig. 1 is a block diagram representation of a portion of one specific telephone system with which this invention may be employed, though it is to be understood that this invention is not to be considered as limited either to this particular telephone system or to employment in combination with telephone systems. Basically the system comprises a plurality, such as one hundred, of subscriber instruments 10 connected by a number of satellite trunks 11, such as ten, to a central office through a satellite office. The satellite office comprises switching apparatus in a network 14 associated with each of the trunks 11, whereby a trunk may be connected to any of the subscriber lines 15, a line information scanner 16 which advantageously is in accordance with this invention, and a common control 18.

The common control 18 provides control information to the line scanner 16 which directs the continuous progressive scan of the subscriber lines 15. The switching network 14 is similarly controlled so as to connect the proper subscriber line 15 to an unoccupied trunk 11 in response to signals received in the common control 18 from the line scanner 16.

In this specific utilization of this invention, the information desired at the common control about the subscriber lines is whether they are idle or requesting new service. This information is received in the common control 18 in the form of distinct "yes" or "no" signals.

Figure 2:
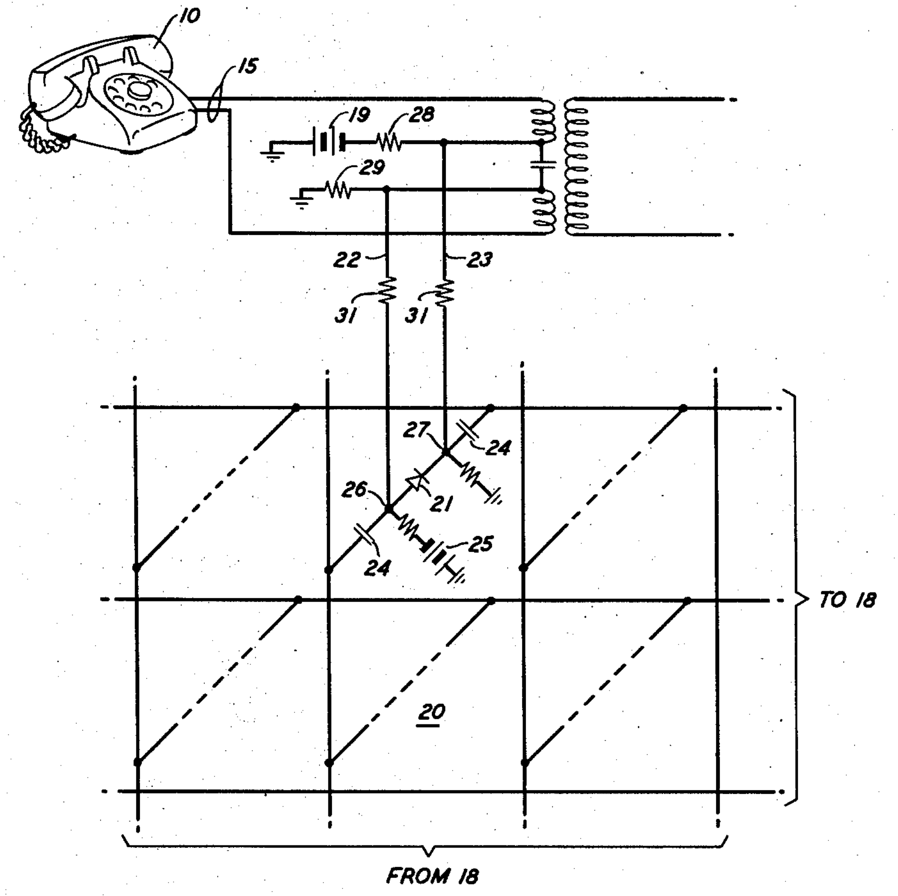
Fig. 2 is a schematic representation of one specific embodiment of a line information scanner illustrative of one aspect of this invention.

Referring now to Fig. 2 there is shown one specific embodiment of this invention for utilization in a telephone system. As there seen the line scanner 16 may comprise a matrix 20 of transmission gates such as 21. Pulses from the common control 18 are received in rotation on the vertical leads of the matrix 20. A plurality of transmission gates 21 is connected to a single one of the vertical leads so that a pulse on a vertical lead is received by a plurality of transmission gates. Each gate 21 has its output side connected to a horizontal lead, again in common with a plurality of other gates. The horizontal leads provide a return path to the common control 18. Transmission gates 21 advantageously comprise, in accordance with this invention, a unidirectional current flow device which is biased only by a certain current flow in the associated subscriber line loop 14 to block passage of an input pulse through the gate 21. The common control, operating on a time division basis, detects the presence or absence of a pulse from the transmission gate 21 during a particular time interval assigned to that gate and operates the switching network 14 to connect or disconnect the line 15 accordingly.

Transmission gate 21 has its pulse input side connected at 26 to the grounded side or tip of the line loop by lead 22. Negative battery 19 on the ring lead of the line loop is connected at 27 to the pulse output side of the gate 21 by lead 23. Resistors 28 and 29 in the ring and tip leads respectively are of equal value and develop bias voltages thereacross upon current flow in the line loop. Condensers 24 isolate the gate 21 as to direct current, while developing the interrogating pulses from the common control 18.

In normal operation with the subscriber line idle (telephone "on hook") the path from battery 19 to ground over the line loop 15 is incomplete and no current flows therein. A negative voltage source 25, equivalent to source 19, is connected to lead 22, and lead 23 is grounded as shown in Fig. 2, so that with the telephone on hook, the voltages at connecting points 26 and 27 may be made equal by proper selection of resistance values in these leads. Such resistance values are high with respect to line loop resistance to limit current flow in these leads. Thus a positive interrogating pulse introduced to gate 21 through input condenser 24 will be passed by the gate with the subscriber line idle. When the line loop 15 is completed by closure of the hookswitch at telephone station 10 preparatory to placing a call, direct current flows in the line loop 15 from battery 24 to ground through bias resistance 28 and 29 so that the potential at connecting point 27 becomes less negative and that at connecting point 26 more negative. A positive interrogating pulse at this time will be blocked by the back bias established across gate 21.

Currents induced in the line loop from external sources such as adjacent power lines will appear in approximately equal amounts on the tip and ring leads of the open line loop. Such spurious currents will raise or lower the potential at connecting points 26 and 27 in equal amounts so that the condition of bias of the gate 21 remains unchanged, and the gate operation is unaffected.

Figure 3:
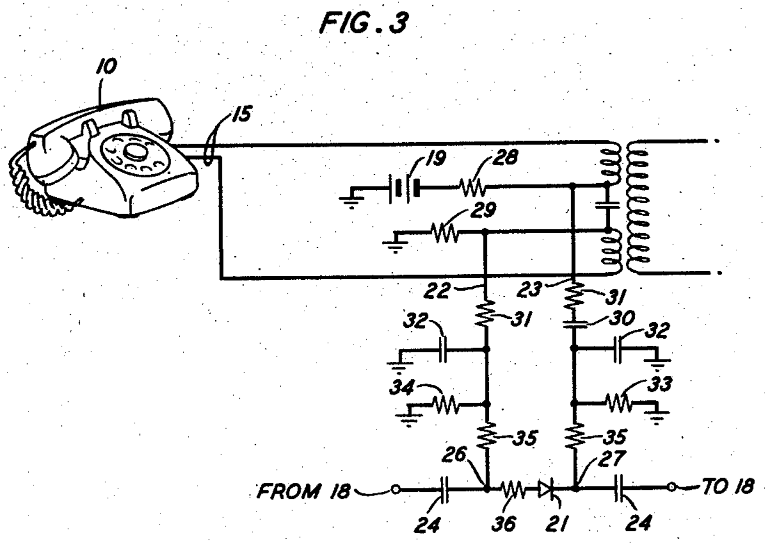
Fig. 3 is a schematic representation of one specific embodiment of a line information scanner illustrative of another aspect of this invention.

Referring now to Fig. 3, there is shown another aspect of one specific embodiment of this invention for utilization in a telephone system. As there depicted a capacitor 30 is inserted in the lead 23, and battery is removed from gate connection 26. This configuration takes cognizance of the fact that the major obstacle to obtaining accurate line condition information is induced alternating current. With the line loop open or idle, the gate 21 again is biased so as to permit passage of interrogating pulses therethrough. With the line loop closed, normal line loop direct current will result in a negative biasing potential at the gate input connection 26 while the potential at gate output connection 27, being isolated from direct current flow in the line by capacitor 30, will remain unchanged. The gate 21 thus is backbiased so as to block interrogating pulses applied thereto at this time. Spurious alternating currents induced in the line are coupled through the capacitor 30 so that the potential at both connecting points 26 and 27 will be raised or lowered in equal amounts. Thus the bias condition of the gate 21 is not affected by such line loop induced currents.

The capacitor 30 also serves a useful purpose during the subscriber dialing operation. The interrupted direct current during dialing creates bias potentials at the line resistors 28 and 29 which add across the gate 21 and create stronger dial pulses upon charging and discharging of the capacitor 30.

Resistance 31 and capacitance 32 advantageously are inserted in each lead 22 and 23 to isolate and protect the gate 21 from heavy voltage surges on the line by providing a low impedance path to ground. Resistance 33 in lead 23 provides a high impedance discharge path to ground for pulse forming capacitor 24 and resistance 34 in lead 22 serves to balance the resistance 33. High impedance 35 in each lead 22 and 23 provides further isolation. Resistance 36 minimizes effects of variations in biasing of the gate 21 and provides a broad output pulse suitable for subsequent detection.

It is to be understood that the above-described arrangements are but illustrative of the application of the principles of this invention. Numerous other arrangements may be devised by those skilled in the art without departing from the spirit and scope of this invention.

What is claimed is:

1. A scanning circuit for signaling the service condition of a subscriber line in a telephone system comprising a first impedance connected to a first wire of said line, a second impedance connected to the second wire of said line, a source of potential connected from said first impedance to said second impedance, a gating circuit connected independently to each of said first and second wires of said line and controlled by the potential condition thereof to provide a service request indication, and an input for receiving scanning pulses connected to said gating circuit.

2. A scanning unit for providing indications of the service condition of a two-wire telephone subscriber line comprising a source of scanning pulses and a gating circuit having a unidirectional current device for receiving scanning pulses, means connecting said device to said source of scanning pulses, a first lead independently connecting the input end of said device to a first wire of said line, and a second lead independently connecting the output end of said device to the second wire of said line, the path of said scanning pulses being controlled by the potentials on said wires.

3. A scanning unit in accordance with claim 2 and further comprising capacitance means in one of said leads to isolate one end of said device as to direct current in said line.

4. A scanning unit in accordance with claim 2 further comprising means connecting said first wire and said second lead to ground potential, a first voltage source connected to said second wire, and a second voltage source connected to said first lead.

5. A scanning unit in accordance with claim 4 wherein said first and second voltage sources supply like voltages.

6. A scanner circuit for each subscriber line in a telephone system comprising a unidirectional current device, means for reverse biasing said device when the associated subscriber line is in a calling condition and for forward biasing said device when said associated line is idle, means including independent electrical connections between said line and each side of said device for preserving the existing device biasing condition on said device when said associated line contains longitudinally induced currents, and an input for receiving scanning pulses connected to said device.

7. In combination, a plurality of devices to be scanned, electrical scanning means comprising a plurality of gating devices biased individually in accordance with the condition of said devices to be scanned, means connecting each side of said gating devices to said devices to be scanned, said connecting means preventing said condition being derived other than from the presence or absence of a direct current through said devices to be scanned, and means for successively supplying scanning pulses to said gating devices.

8. A scanning matrix having $n$ input terminals for receiving scanning pulses, $n^2$ scanning units and $n^2$ devices to be scanned associated individually with said scanning units, each of said scanning units including a unidirectional current device normally biased to be conducting, said scanning units being connected to the associated one of said scanning pulse input terminals, and means connecting said scanning units to the associated one of said devices to be scanned, said connecting means assuring that only a direct current flow through said devices will bias said scanning units to be nonconducting.

9. An electrical system comprising a line having a pair of wires, means including said wires and a source of direct current potential defining a direct current circuit for said line, means for transmitting information indicating the condition of said line comprising a signal source, gating means connected to said signal source, first means independently electrically connecting the input end of said gating means to a first one of said pair of wires and second means independently electrically connecting the output end of said gating means to the other of said pair of wires.

10. An electrical system in accordance with claim 9 wherein one of said first and second connecting means comprises a capacitor.

11. An electrical system in accordance with claim 9 further comprising a first impedance connected to said first wire, a second impedance connected to said second wire, said source of potential being connected from said first impedance to said second impedance.

12. An electrical system in accordance with claim 9 wherein said first wire and the output end of said gating means are grounded and further comprising a second source of potential connected to the input end of said gating means.

References Cited in the file of this patent

UNITED STATES PATENTS

| | | |
|---|---|---|
| 2,715,656 | Andrews | Aug. 16, 1955 |
| 2,724,744 | Brewer et al. | Nov. 22, 1955 |
| 2,783,307 | Brewer | Feb. 26, 1957 |